United States Patent [19]

Posey

[11] Patent Number: 5,269,182

[45] Date of Patent: Dec. 14, 1993

[54] MERCURY CONTAINMENT DEVICE AND METHOD

[76] Inventor: Tommy H. Posey, 1215 Tejas, Midland, Tex. 79705

[21] Appl. No.: 765,429

[22] Filed: Sep. 25, 1991

[51] Int. Cl.⁵ .............................................. G01F 15/00
[52] U.S. Cl. ........................................ 73/201; 137/312
[58] Field of Search ......................... 73/431, 201, 198; 251/57; 137/312-314

[56] References Cited

U.S. PATENT DOCUMENTS

| | | | |
|---|---|---|---|
| 1,631,438 | 6/1927 | Sullivan | 137/314 |
| 3,842,504 | 10/1974 | Ricks | 251/57 X |
| 3,902,368 | 9/1975 | Hosenbein et al. | 73/167 |
| 4,343,188 | 8/1982 | Baker | 73/706 |
| 4,409,817 | 10/1983 | Edwards, Jr. | 73/40.7 |
| 4,461,181 | 7/1984 | North, Jr. | 73/706 X |
| 4,643,523 | 2/1987 | Smedley et al. | 73/201 X |
| 4,809,548 | 3/1989 | Rivero-Olmedo | 73/201 |
| 4,904,830 | 2/1990 | Rizzuto | 137/312 X |
| 4,907,450 | 3/1990 | Bednarz | 73/201 |

FOREIGN PATENT DOCUMENTS

| | | | |
|---|---|---|---|
| 2399648 | 4/1979 | France | 73/201 |
| 304286 | 12/1990 | Japan | 137/312 |

*Primary Examiner*—Tom Noland
*Attorney, Agent, or Firm*—Ross, Howison, Clapp & Korn

[57] ABSTRACT

A mercury leak containment device for removable attachment to an existing natural gas meter valve includes a container having a top opening for enclosing the fittings at which mercury may leak from the gas meter valve, a top cap for closing the top opening of the container when it is installed on an existing gas meter valve to deflect precipitation from entering the container, and a removable support for holding the mercury leak containment device in place with the fittings of the valve which are most likely to leak mercury fully enclosed.

15 Claims, 2 Drawing Sheets

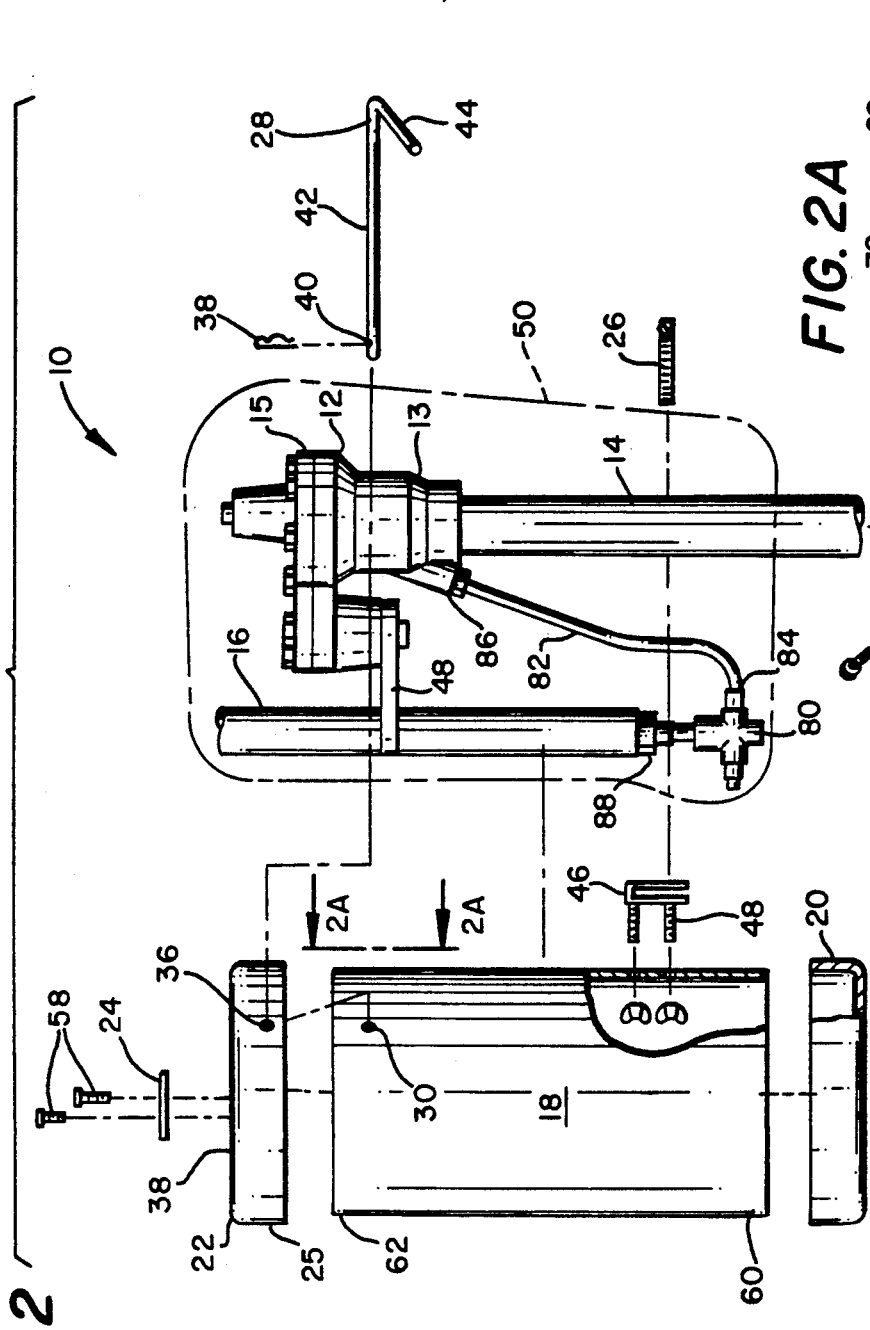
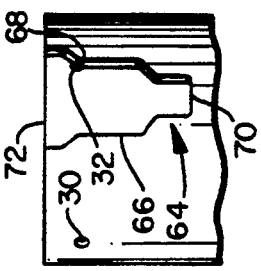
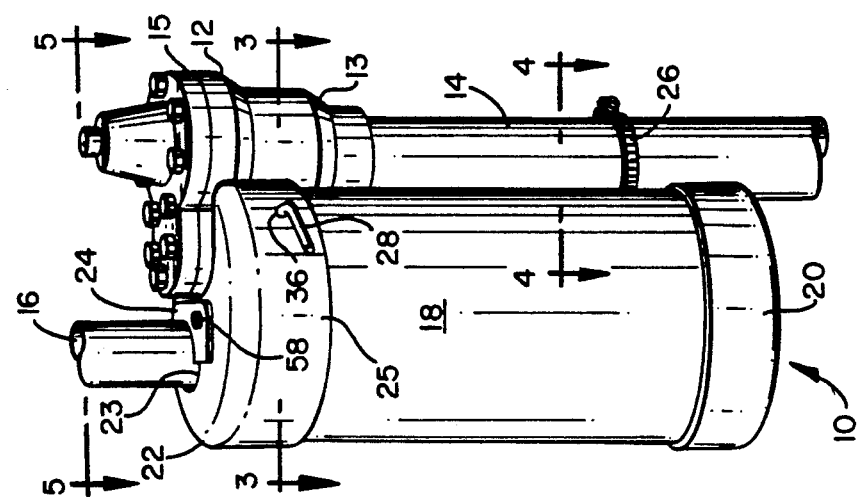

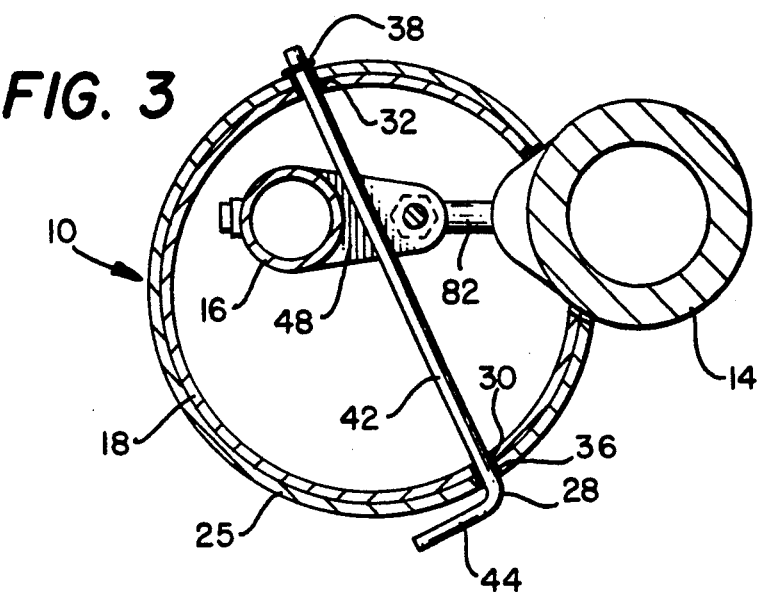
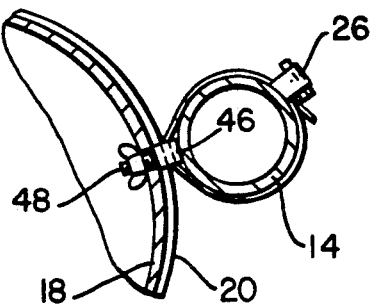
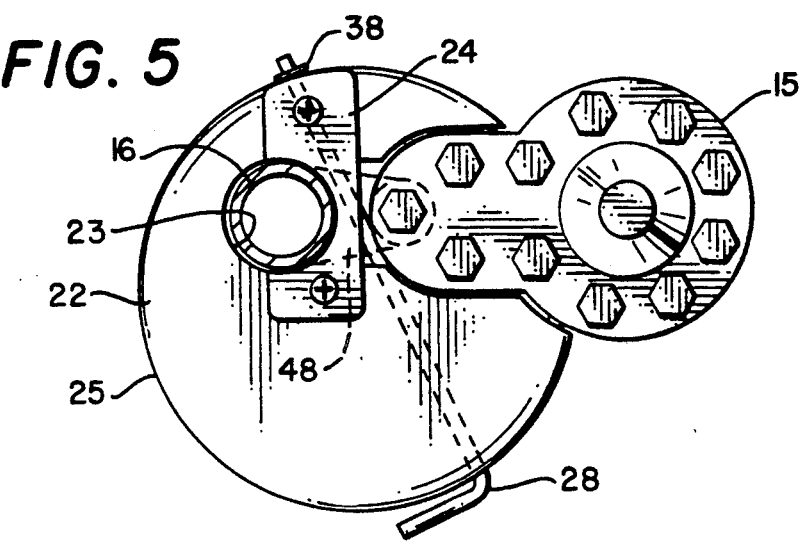

MERCURY CONTAINMENT DEVICE AND METHOD

TECHNICAL FIELD OF THE INVENTION

The present invention relates to a mercury containment device and in particular to a removably attachable device for containing mercury which may overflow, leak or otherwise escape from a standard natural gas metering valve.

BACKGROUND OF THE INVENTION

Gas metering valves such as those manufactured by American Metering Company are in common use in natural gas pipeline operations in which a component of the metering mechanism is a column of liquid mercury, over time, due to seal deterioration or other malfunctions and as the gas pressure fluctuates in the pipeline and through the valve, mercury can be forced out of the valve through otherwise sealed connections, over flow valves and/or relief valves. In standard available meters the mercury thus expelled from the meter spills onto the ground. Spilled mercury has always been a concern and efforts have been made to maintain proper seals and meter functions. In recent years the concern has increased along with increased awareness of the potentially harmful effects of heavy metals, including mercury, on the environment. To the extent that there has been some spillage of mercury from gas metering valves, it has required expensive and time consuming clean up operations. The potential problems associated with clean up operations are particularly acute where the mercury can spill directly onto the soil. The problem also exists, but is not as serious, where the spill may be temporarily trapped on concrete floors or other liquid impermeable surfaces below the gas metering valve.

Periodic seal changes in existing gas meters at regular time intervals are helpful to reduce leakage but cause costly interruption of gas pipeline operations and are not totally effective as the malfunctions cannot always be predicted on the basis of time in service alone. Retrofitting old installations with newer valves would also be costly and newer meters may suffer from the same leakage problems. In many instances retro- fitting would require costly modifications, repairs or even total replacement of the entire installation.

The present invention provides an economical device which is attachable to existing gas meters to thereby collect any mercury which may escape and spill from the valve. The heavy metal is contained until it can be properly removed for recycling or for proper environmentally safe disposal. The containment device is uniquely constructed for rapid and convenient attachment to existing meters without interrupting pipeline operations. It provides a close fitting interface with the existing exposed gas meter surfaces in combination with a close fitting cover to reduce both evaporation of collected and contained mercury and also to reduce collection of rain water and the like atmospheric precipitation.

SUMMARY OF THE INVENTION

The inventive collector comprises a mercury leak containment device for removable attachment to an existing natural gas meter and valve assembly which includes a hollow body having a bottom cap, a top opening for enclosing the portions of the gas meter and valve assembly at which mercury may leak such as at the fittings of the U-tube mercury column. There is a top cap for closing the top opening of the hollow body when the device is installed on the gas meter and valve assembly to deflect precipitation from entering the containment device. The containment device is removably supported in place with the U-tube fittings enclosed so that any mercury which might leak therefrom is contained and does not leak onto the ground or otherwise into the environment.

BRIEF DESCRIPTION OF THE DRAWINGS

These and other advantages and objects of the present invention will be more fully understood with reference to the Drawings in which like numerals represent like elements and in which:

FIG. 1 is a perspective view of the assembled inventive containment device of the present invention shown in place on an existing gas metering valve;

FIG. 2 is an exploded side view with a partial cut away section showing the component parts for assembly of the inventive mercury containment device onto an existing gas meter valve;

FIG. 2A is a partial side view of the portion of the invention as shown at 2A—2A of FIG. 2 showing the unique curvilinear interface surface for close tolerance mating with the exterior casting of an existing gas meter valve;

FIG. 3 is a cross-section view taken along section line 3—3 of FIG. 1 showing the upper support pin engagement with an existing gas meter valve support brace;

FIG. 4 is a partial cross-section view along section line 4—4 of FIG. 1 showing the lower support bracket attachment: and FIG. 5 is a top view of the assembled invention in place on a gas meter showing the top cap which is cut to fit the meter and showing the closure cover plate attached according to the present invention.

DETAILED DESCRIPTION OF THE INVENTION

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

FIG. 1 shows a perspective view of the mercury containment device 10 of the present invention. Mercury containment device 10 is attached to natural gas valve 12 which is coaxially positioned on top of a gas meter stanchion post 14. As shown gas valve 12 typically has a cast exterior surface which is flared stepwise from the diameter of post 14 to the appropriate size for the top plate 15. Adjacent to post 14 and valve 12 is a vertical gas pipe 16 which, as will be explained more fully below, is partially enclosed within the containment device 10.

With reference to FIGS. 1 and 2 together, the construction of the containment device 10 will be more fully understood. A containment body 18 has sealingly attached thereto a bottom cap 20 and has a removably attached top cap 22 which defines an opening 23 sized and configured to accommodate and slip over gas pipe 16 and particularly against the valve 12. A cover plate 24 is removably placed upon and attached to top cap 22 to close any remaining opening 23 and thereby deflect rain, snow or other precipitation as may impact top cap 22 so that such precipitation will not directly enter hollow body 18. In the preferred embodiment, body 18 may be constructed of about an 8 inches diameter (about 20 cm) to about 12 inches diameter (about 25 cm) cylindrical polyvinyl chloride (PVC) pipe, such as 8 inch plastic irrigation pipe (PIP). Typically a section of pipe about 1 foot (about 0.3 meters) to about 4 feet (about 1.2 meters) long will enclose the U-tube mercury column. Bottom cap 20 and top cap 22 can be formed of 8 inch, 50 lb. PVC caps. Bottom cap 22 is glue fused or otherwise sealingly cemented at bottom end 60. Top cap 22 is held in place partially in a slip fit manner with overlapping sides 25. Opening 23 at its juncture with sides 25, is preferably a cut out portion which is less than 180 degrees around the rim 25 of top cap 22. Hollow body 18 is further held in place with lower clamp 26 and upper support pin 28. Upper support pin 28 is inserted through aligned holes 30 and 32 (see FIG. 2A) which are formed in the upper end 62 of body portion 18. In the preferred embodiment, top cap 22 is also formed with aligned holes 36 and 38 therein (as shown in FIGS. 3 and 5). Aligned holes 36 and 38 correspond in location to aligned holes 30 and 32 in the hollow body portion 18. Support pin 28 will be held in place with a locking clip 38 such as a hair pin type clip inserted through a hole 40 adjacent one end along leg 42 of support pin 28. Handle 44 is used to manipulate support pin 28 through the aligned holes and acts as a stop to prevent the pin from moving too far through the holes. Pin 28 is positioned by holes 30 and 32 so that it rests against the top surface of brace 48.

Typically a meter box 50 (shown in phantom lines in FIGS. 2 and 5) is attached adjacent valve 12 and creates space limitations which are overcome with the present invention. During assembly the existing meter box support bracket is removed and is replaced with a specially designed meter box support angle bracket 56 for engagement with support clamp 54.

With reference to FIG. 2A, which is a partial side view of top end 62 of hollow body 18 of FIG. 2, the cut away portion defined in top portion 62 of hollow body 18 can be more fully understood. A cutaway portion 65 results from and is defined by a curvilinear interface surface 64 which comprises first side surface 66 specifically designed for close tolerance interface fit with exterior surface 13 of valve 12. A bottom lip portion 70 fits adjacent to post 14 immediately below valve body 12 and curvilinear second side face 68 mates closely with the back surface of valve body 12. Thus the upper lip 72 of hollow body 18 is slipped vertically upward from below to enclose the mercury valve fittings which are most likely to leak mercury during a continuous operation. The potential leak points enclosed include T-fitting 80, U-tube 82, valve side connector 84, T-fitting top connector 86 and vertical pipe connector 88. Advantageously, with all of these fittings totally enclosed in the preferred embodiment, mercury leakage will be collected and contained in the containment device 10 according to the present invention.

The body 18, with bottom cap 20 sealed thereon, is slipped upward to enclose the fittings and is manually positioned with curvilinear surface 64 against valve 12. Clamp 26 is tightened on U-bracket 46 and cap 22 is placed onto the top end 62 with sides 25 of top cap 22 overlapping lip 72 of top end 62 of hollow body 18. With both the hollow body 18 and top cap 22 in position, support pin 28 is inserted through holes 36 and 38 of top cap 22 and also through aligned holes 30 and 32 of hollow body 18. Support pin 28 is uniquely aligned so that it rests against support brace 48 to advantageously give the containment device 10 releasable top end support. Support pin 28 is then clipped into place using hair clip 38 or other acceptable fastening means. Once in place there will be only a small portion of opening 23 remaining opened. The remaining opening is covered with covered plate 24, which is held in place with fasteners 58 which may be standard screws or wing bolts for convenient use.

FIG. 3 is a top cross sectional view at the section line 3—3 of FIG. 1 showing the upper support pin 28 engagement against brace 48 and also against vertical pipe 16.

FIG. 4 depicts a partial cross sectional view of the lower clamp attachment 26 and U-bracket 46. While the drawing shows an embodiment with a bolt and wing nut arrangement, other fastening arrangements may be used.

FIG. 5 is a top plan view of the assembled inventive mercury containment device 10 shown in place on a gas meter. The present invention advantageously overcomes problems associated with the close spacing between the meter box 50 (shown in phantom lines) and the valve 12, and the components to be enclosed by the inventive containment device 10. From this view it can be seen that both the opening portion 23 of the top cap 22, which is cut away therefrom, advantageously accommodates valve body 12 and also accommodated vertical pipe 16. Cut away opening portion 23 advantageously spans less than 180 degrees around the circumference of top cap 22. This allows top cap 22 to obtain support in both the vertical and the horizontal directions from both support pin 28 and also from the side surfaces of container body 18. The opening portion 93 which remains when top cap 22 is placed in position is depicted in hidden lines and is substantially completely covered with cover 24 such that substantially all precipitation and other contaminants are deflected from entry into container body 18. The unique top cap cut out contour 92 forms a close tolerance interface 98 with exterior surface 13 of valve body 12. Likewise, semicircular opening portion 94 of cover plate 24 forms a close tolerance fit with vertical pipe 16 while cover edge 96 forms a close tolerance interface 100 with valve body 12.

In the preferred embodiment as shown in the Figures, the entire construction of the containment device 10 can be made from readily available materials such as inexpensive PIP PVC pipe for hollow body 18 with PIP PVC caps for bottom cap 20 and top cap 22. Likewise cover 24 can be made of a similar PVC or other plastic material. The clamps, screws and support rods are also made of readily available material, typically metallic machine stock. Thus an inexpensive yet effective mercury containment device has been disclosed which is removably attachable to existing natural gas metering valves which may employ a column of liquid mercury. The inventive device is constructed so that mercury which might leak can be contained and held over a period of time and may be collected for recycling or environmentally safe disposal. The removable and replaceable construction of the inventive mercury containment device allows for convenient attachment, removal and reattachment by field personnel. In this manner and with the present invention, the environment is made safer at a low cost without expensive construction and retro fit replacement of existing natural gas flow meters.

Although preferred embodiments have been described in detail, it should be understood that various changes, substitutions and alterations can be made therein without departing from the spirit and scope of the invention as defined by the appended claims.

What is claimed is:

1. A mercury leak containment device for removable installation on a natural gas valve of the type having a valve body coaxially affixed at the top of a valve stanchion post and step wise flared larger toward the top thereof and having a U-tube mercury column connected at a first end through a fitting to the valve body and connected at a second end through a fitting to a vertical gas pipe projecting upwardly therefrom parallel to the stanchion valve post which vertical pipe is rigidly mounted adjacent to the valve body with a horizontal support brace, the mercury leak containment device comprising:
    (a) a substantially liquid tight hollow body having a top end and a bottom end and dimensioned for enclosing the U-tube mercury column and the vertical gas pipe;
    (b) the top end of said hollow body defining a curved cut out portion correspondingly shaped for close tolerance interface fit against an exterior surface of the step wise flared gas valve and defining aligned holes above the horizontal support brace adjacent the curved cut out portion of the hollow body;
    (c) a removably attachable top cap sized for slip fit overlapping engagement on the top end of the hollow body and defining an irregular opening for accommodating portions of the gas pipe and the gas valve above the enclosed U-tube mercury column;
    (d) a removable top cover for closing the opening defined by the top cap after it is in place on the top end of the installed mercury containment device, which top cover is sized for close tolerance fit against a portion of the exterior surfaces of the gas valve and of the vertical gas pipe and to deflect precipitation from entering the hollow body;
    (e) a removable top support pin sized for slip fit insertion through the aligned holes above the horizontal support brace for resting thereon to support the top end of the containment device;
    (f) a lower body support bracket and operatively associated clamp for removable rigid holding of the bottom end of the containment device; and
    (g) a bottom cap affixed substantially liquid tight to the bottom end of the hollow body below the U-tube mercury column so that any mercury leakage from the U-tube, the gas valve, the gas pipe or the fittings thereon, is contained within the installed mercury containment device.

2. A mercury leak containment device as in claim 1 wherein the hollow body comprises a section of PVC pipe with a diameter larger than the distance from the gas valve to the opposite side of the vertical gas pipe and with a length longer than the distance from the top sealing surface of the gas valve to the lowest point on the U-tube mercury column.

3. A mercury leak containment device as in claim 2 wherein the bottom cap is a PVC cap corresponding in size to the PVC pipe hollow body and is sealed thereto and said top cap is a PVC cap having a cut out portion spanning less than 180 degrees around the circumference thereof, which cut out portion accommodates the vertical gas pipe and the gas valve yet has sufficient portions to hold the top cap on the top end of the hollow body.

4. A mercury leak containment device as in claim 1 wherein the top cap has overlapping side portions with holes therein aligned with the aligned support pin holes of the hollow body so that the support pin is insertable therethrough to hold the top cap in place.

5. A mercury leak containment device as in claim 4 wherein the support pin comprises:
    (a) an "L" shaped pin with a circular cross-section having a leg portion for inserting through the aligned holes of the hollow body and the aligned holes of the top cap and a handle portion for abutment against an exterior surface of the top cap;
    (b) a locking hole in one end of the leg of the "L" shaped support pin positioned to project exterior to the top cap when fully inserted through the aligned holes; and
    (c) a hair pin clip removably fastenable through the locking hole to removably hold the support pin in place.

6. A mercury leak containment device as in claim 1 wherein the lower bracket and the lower clamp comprise:
    (a) a U-shaped mounting bracket bolted with one leg of the U-bracket against the side of the hollow body proximate to the bottom end thereof, and with the other leg of the U-shaped bracket spaced apart from the hollow body a short distance; and
    (b) a hose clamp sized for encircling the stanchion post and for adjustably clamping the other leg of the U-bracket rigidly against the stanchion.

7. A mercury leak containment device for removable attachment to an existing natural gas meter mercury valve, comprising:
    (a) a container having a top opening for enclosing, from below, the fittings at which mercury may leak from the gas meter mercury valve;
    (b) a top cap for closing the top opening of the container when installed on the gas meter to deflect precipitation from entering the container;
    (c) a removable support for holding the container in place with the mercury leaking fittings enclosed;
    (d) a hollow body with a top end and a bottom end, said hollow body composed of a PVC pipe;
    (e) a bottom cap sealingly affixed on the bottom end, said bottom cap composed of a PVC cap securely cemented to the bottom of the PVC pipe hollow body; and
    (f) a portion of the top end defining a curved cut out portion for close tolerance interface fit against an exterior surface of the gas valve.

8. A mercury leak containment device as in claim 7 wherein the top cap comprises:
    (a) a first portion partially overlapping the top end of the hollow body defining an opening to accommodate a portion of the gas meter valve projecting above the hollow body; and
    (b) a cover plate removably attachable to the first portion of the top cap and overlapping the opening defined by the top cap so that the cover plate is in close tolerance interface fit with the portion of the gas meter valve projecting through the opening in the first cap portion so that the opening is substantially completely covered to deflect precipitation from entering the container.

9. A mercury leak containment device as in claim 7 wherein the removable support for holding the container in place comprises:
   (a) an upper support pin insertable through aligned holes in the top of the container so that the pin rest against a portion of the gas valve structure to give support to the container;
   (b) a lower bracket affixed to the container; and
   (c) a clamp operatively associated with the lower bracket to clamp it to a lower portion of the gas valve stanchion post.

10. A method for containing mercury leaks from an existing natural gas meter mercury valve on a stanchion post comprising the steps of:
   (a) enclosing, from below, the fittings at which mercury may leak from the gas meter mercury valve within a container having a top opening;
   (b) closing the top opening of the container when installed on the gas meter to deflect precipitation from entering the container;
   (c) removably holding the container in place with the mercury leaking fittings enclosed;
   (d) removing an existing meter cross support bracket; and
   (e) replacing the cross support bracket with a shorter bent bracket which will not interfere with the container.

11. A method of containing mercury leaks as in claim 10 further comprising the steps of:
   (a) periodically removing the top cap to check the container for mercury contained therein;
   (b) removing the container if mercury is contained therein;
   (c) emptying mercury from the removed container into an environmentally safe mercury collection receptacle; and
   (d) replacing the container and top cap removably held in place on the gas meter mercury valve.

12. A method for containing mercury leaks from an existing natural gas meter mercury valve on a stanchion post comprising the steps of:
   (a) enclosing, from below, the fittings at which mercury may leak from the gas meter mercury valve within a container having a top opening;
   (b) closing the top opening of the container when installed on the gas meter to deflect precipitation from entering the container;
   (c) removably holding the container in place with the mercury leaking fittings enclosed;
   (d) forming the container from a hollow body with an open top end and an open bottom end;
   (e) sealingly affixing a bottom cap on the open bottom end of the hollow body;
   (f) cutting a curved portion out of the open top end of the hollow body; and
   (g) placing the curved cut out portion of the top end in close tolerance interface fit against an exterior surface of the gas valve.

13. A method for containing mercury leaks as in claim 12 wherein the step of forming the container from a hollow body includes the steps of obtaining a PVC pipe with sufficient diameter to enclose the fittings and the step of capping the bottom includes securely cementing a PVC cap to the bottom of the PVC pipe hollow body.

14. A method for containing mercury leaks as in claim 12 wherein the step of closing the top opening of the container further comprises:
   (a) partially over-lapping the top end of the hollow body with a first top cap portion defining an opening shaped to accommodate a portion of the gas meter valve projecting above the hollow body; and
   (b) removably attaching a cover plate to the first portion of the top cap and overlapping the opening defined by the top cap so that the cover plate is in close tolerance interface fit with a portion of the gas meter valve projecting through the opening in the first cap portion and so that the remaining opening in the first cap portion is substantially completely covered to deflect precipitation from entering the container.

15. A method of containing mercury leaks as in claim 12 wherein the step of removably holding the container in place further comprises the steps of:
   (a) forming aligned holes in the top end of the hollow body and in the top cap;
   (b) inserting an upper support pin through the aligned holes in the top of the container so that the support pin rests against a portion of the gas valve structure to give support to the container;
   (c) affixing a lower bracket to the container; and
   (d) clamping the lower bracket to a lower portion of the gas valve stanchion post.

* * * * *